US010008907B2

(12) United States Patent
Hanumalagutti et al.

(10) Patent No.: US 10,008,907 B2
(45) Date of Patent: Jun. 26, 2018

(54) OVER MOLD WITH INTEGRATED INSERT TO ENHANCE HEAT TRANSFER FROM AN ELECTRIC MACHINE END WINDING

(71) Applicant: Ford Global Technologies, LLC, Dearborn, MI (US)

(72) Inventors: Prasad Dev Hanumalagutti, Dearborn, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 153 days.

(21) Appl. No.: 15/072,676

(22) Filed: Mar. 17, 2016

(65) Prior Publication Data

US 2017/0271954 A1 Sep. 21, 2017

(51) Int. Cl.
*H02K 9/19* (2006.01)
*H02K 5/02* (2006.01)
*H02K 5/18* (2006.01)
*H02K 5/20* (2006.01)

(52) U.S. Cl.
CPC .............. *H02K 9/19* (2013.01); *H02K 5/02* (2013.01); *H02K 5/18* (2013.01); *H02K 5/20* (2013.01)

(58) Field of Classification Search
CPC .......... H02K 9/19; H02K 9/193; H02K 9/197; H02K 5/02; H02K 5/18; H02K 5/20; H02K 3/24
USPC ........................ 310/54, 58, 59, 60 R, 60 A
See application file for complete search history.

(56) References Cited

U.S. PATENT DOCUMENTS

| | | | |
|---|---|---|---|
| 5,845,389 | A | 12/1998 | Roberts et al. |
| 6,211,587 | B1 | 4/2001 | Enomoto et al. |
| 6,300,693 | B1 | 10/2001 | Poag et al. |
| 6,407,474 | B1 | 6/2002 | Mahn et al. |
| 6,452,294 | B1 | 9/2002 | Vandervort et al. |
| 6,515,384 | B1 * | 2/2003 | Kikuchi ............... H02K 9/197 310/58 |
| 6,727,611 | B2 | 4/2004 | Bostwick |
| 6,787,950 | B2 | 9/2004 | Heim |
| 6,856,053 | B2 | 2/2005 | LeFlem et al. |
| 7,157,818 | B2 | 1/2007 | Jones |
| 7,538,457 | B2 | 5/2009 | Holmes et al. |
| 7,566,999 | B2 | 7/2009 | Neal |
| 7,692,356 | B2 | 4/2010 | Bott et al. |
| 7,768,166 | B2 | 8/2010 | Lafontaine et al. |
| 7,928,348 | B2 | 4/2011 | Neal |
| 8,080,908 | B2 | 12/2011 | Matsubara et al. |
| 8,080,909 | B2 | 12/2011 | Perkins |
| 8,138,640 | B2 | 3/2012 | Urano et al. |
| 8,405,262 | B1 | 3/2013 | Beatty et al. |
| 8,766,497 | B2 | 7/2014 | Goto et al. |
| 8,963,384 | B2 | 2/2015 | Kirkley, Jr. et al. |
| 2008/0042498 | A1 | 2/2008 | Beer |

(Continued)

*Primary Examiner* — Michael Andrews
(74) *Attorney, Agent, or Firm* — David B. Kelley; Brooks Kushman P.C.

(57) ABSTRACT

An electric machine includes a stator. The stator has a plurality of slots defined between a plurality of laminated protrusions. A plurality of wire windings is disposed in the slots. The wire windings form end windings at respective ends of the stator. A cover is disposed about the end windings. A coolant chamber is defined between an inner surface of the cover and the stator. The cover includes a plurality of flow disruption members extending from the inner surface into the coolant chamber.

16 Claims, 8 Drawing Sheets

(56) References Cited

U.S. PATENT DOCUMENTS

| | | | |
|---|---|---|---|
| 2008/0042502 A1* | 2/2008 | VanLuik | H02K 9/14 |
| | | | 310/89 |
| 2008/0143203 A1 | 6/2008 | Purvines et al. | |
| 2010/0045125 A1* | 2/2010 | Takenaka | H02K 9/19 |
| | | | 310/54 |
| 2011/0215660 A1 | 9/2011 | Goto et al. | |
| 2012/0032543 A1* | 2/2012 | Chakraborty | H02K 9/19 |
| | | | 310/90 |
| 2012/0062056 A1* | 3/2012 | Bradfield | H02K 9/19 |
| | | | 310/58 |
| 2012/0091838 A1 | 4/2012 | Miyamoto et al. | |
| 2012/0242178 A1 | 9/2012 | Miyamoto et al. | |
| 2013/0342049 A1 | 12/2013 | Stridsberg | |
| 2014/0265663 A1 | 9/2014 | Chamberlin et al. | |
| 2014/0265670 A1 | 9/2014 | Chamberlin et al. | |
| 2014/0354090 A1 | 12/2014 | Chamberlin | |
| 2015/0217632 A1 | 8/2015 | Lebeau et al. | |
| 2015/0280525 A1 | 10/2015 | Rippel et al. | |
| 2015/0280526 A1 | 10/2015 | Chamberlin et al. | |
| 2017/0025911 A1* | 1/2017 | Jewell | H02K 9/197 |

* cited by examiner

OVER MOLD WITH INTEGRATED INSERT TO ENHANCE HEAT TRANSFER FROM AN ELECTRIC MACHINE END WINDING

TECHNICAL FIELD

The present disclosure relates to electric machines, and more particularly to the cooling of electric machines.

BACKGROUND

Electric machines, which may be alternatively referred to as motors and/or generators, typically include a rotor and a stator. The stator includes a plurality of electrical coil windings which may be supplied with electric current to produce a magnetic field. The rotor produces a second, rotating magnetic field, by, e.g., permanent magnets or via a second set of electrical coil windings. To obtain increased performance and extend life of the motor, it is desirable to cool the coil windings.

SUMMARY

An electric machine according to the present disclosure includes a stator. The stator has a plurality of slots defined therein. A plurality of wire windings is disposed in the slots. The wire windings form end windings at ends of the stator. A cover is disposed about the end windings. A coolant chamber is defined between an inner surface of the cover and the stator. The cover includes a plurality of flow disruption members extending from the inner surface into the coolant chamber.

According to at least one embodiment, the electric machine includes a plurality of coolant passages extending through the cover in fluid communication with the coolant chamber. A coolant supply duct is coupled to at least one of the coolant passages. The coolant supply duct is configured to provide a coolant fluid to the coolant chamber. The coolant fluid may include a hydrocarbon lubricant.

According to at least one embodiment, the cover is generally shaped as an annular ring with a first circumferential portion and a second circumferential portion. The first circumferential portion has the plurality of flow disruption members extending from the inner surface. The second circumferential portion has no flow disruption members extending from the inner surface.

According to at least one embodiment, the cover includes an outer shell and an intermediate shell. In such an embodiment, the inner surface with the flow disruption members is an inner surface of the intermediate shell. The intermediate shell also has an intermediate shell outer surface, and the outer shell has an outer shell inner surface. A second coolant chamber is defined between the outer shell inner surface and the intermediate shell outer surface. The second coolant chamber is in fluid communication with the coolant chamber.

According to at least one embodiment, the cover comprises an epoxy material.

According to at least one embodiment, the plurality of flow disruption members form an integral unit with the cover.

A method of cooling an electric machine according to the present disclosure includes providing an electric machine. The electric machine includes a stator with slots defined therein and wire windings disposed in the slots. The wire windings form end windings at opposing ends of the stator. The method additionally includes disposing a cover about the end windings to define a coolant chamber between an inner surface of the cover and the stator. The cover includes a plurality of flow disruption members extending from the inner surface into the coolant chamber.

According to at least one embodiment, the method additionally includes providing a coolant fluid to the coolant chamber. According to a variant of the embodiment, the cover includes a plurality of coolant passages extending through the cover and in fluid communication with the coolant chamber, and a coolant supply duct coupled to at least one of the coolant passages. In such an embodiment, providing a coolant fluid comprises providing a coolant fluid via the coolant supply duct.

An electric motor according to the present disclosure includes a stator. The stator has a first end, a second end, and a central portion extending from the first end to the second end. The central portion has projections extending therefrom, defining slots between the projections. A plurality of wire windings are disposed in the slots. The plurality of wire windings include end windings proximate both the first end and the second end of the stator. The electric motor includes at least one encasement disposed about the end windings. The encasement has an inner surface, with a coolant cavity being defined between the inner surface and the stator. The encasement includes a plurality of turbulence generation members extending from the inner surface into the coolant cavity.

Embodiments according to the present disclosure provide a number of advantages. For example, the present disclosure provides a coolant device for end windings of an electric machine that provides consistent cooling for all end windings, avoiding hot spots which may degrade the electric machine. This may improve reliability and, in turn, increase customer satisfaction.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
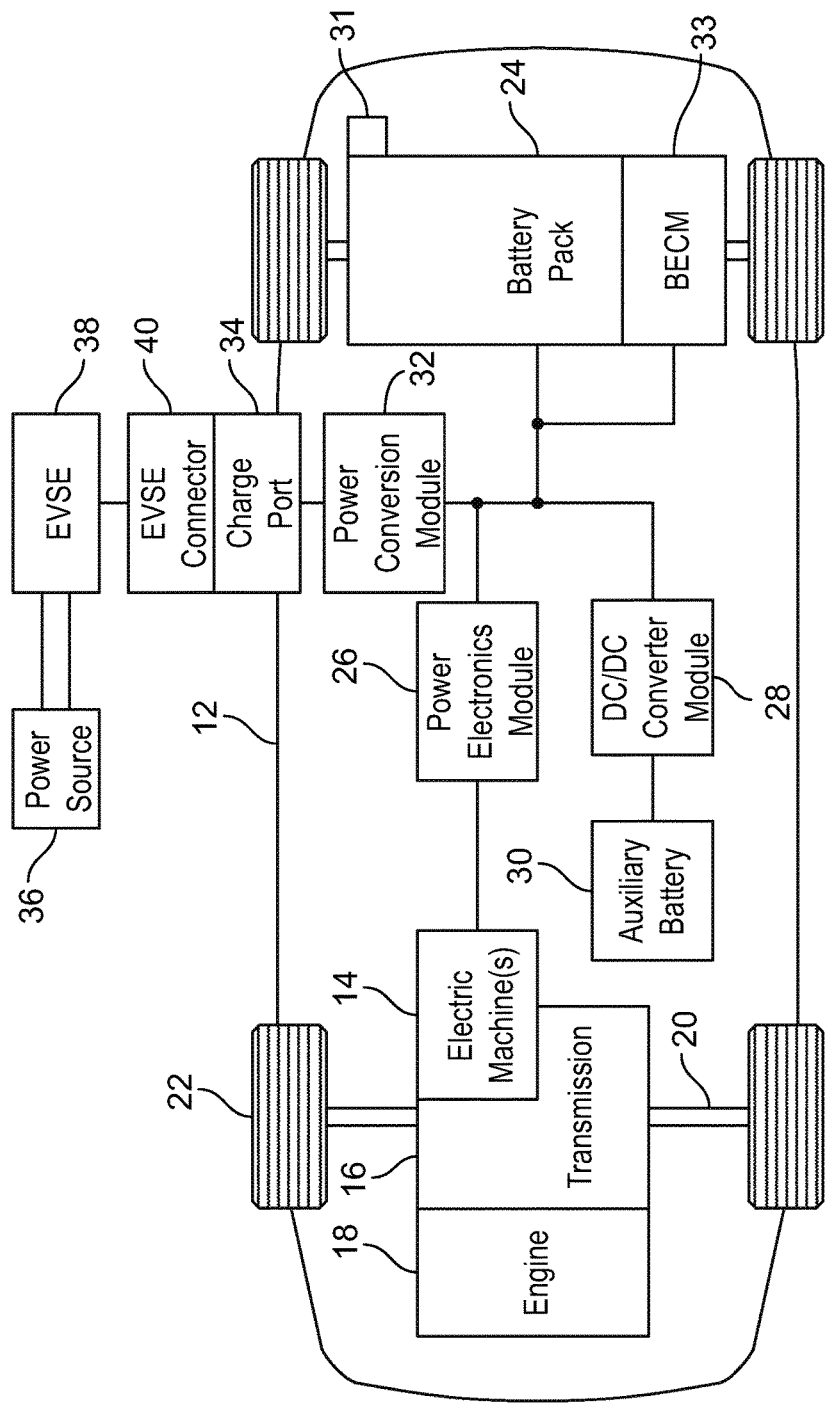
FIG. 1 is a schematic representation of an electric vehicle according to the present disclosure.

FIG. 1 depicts a schematic of an example of a plug-in hybrid electric vehicle (PHEV), referred to as a vehicle 12 herein. While FIG. 1 depicts a PHEV, embodiments within the scope of the present invention may be implemented in a full hybrid electric vehicle (FHEV), mild hybrid electric vehicle (MHEV), battery electric vehicle (BEV), or other types of vehicles as appropriate.

The vehicle 12 may comprise one or more electric machines 14 mechanically connected to a hybrid transmission 16. The electric machine 14 may be capable of operating as a motor and/or a generator. In addition, the hybrid transmission 16 may be mechanically connected to an engine 18. The hybrid transmission 16 may also be mechanically connected to a drive shaft 20 that is mechanically connected to the wheels 22. The electric machines 14 may provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may also be electrically connected to the electric machines 14 and provides the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter module 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter module 28. The low-voltage systems may be electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

Figure 2:
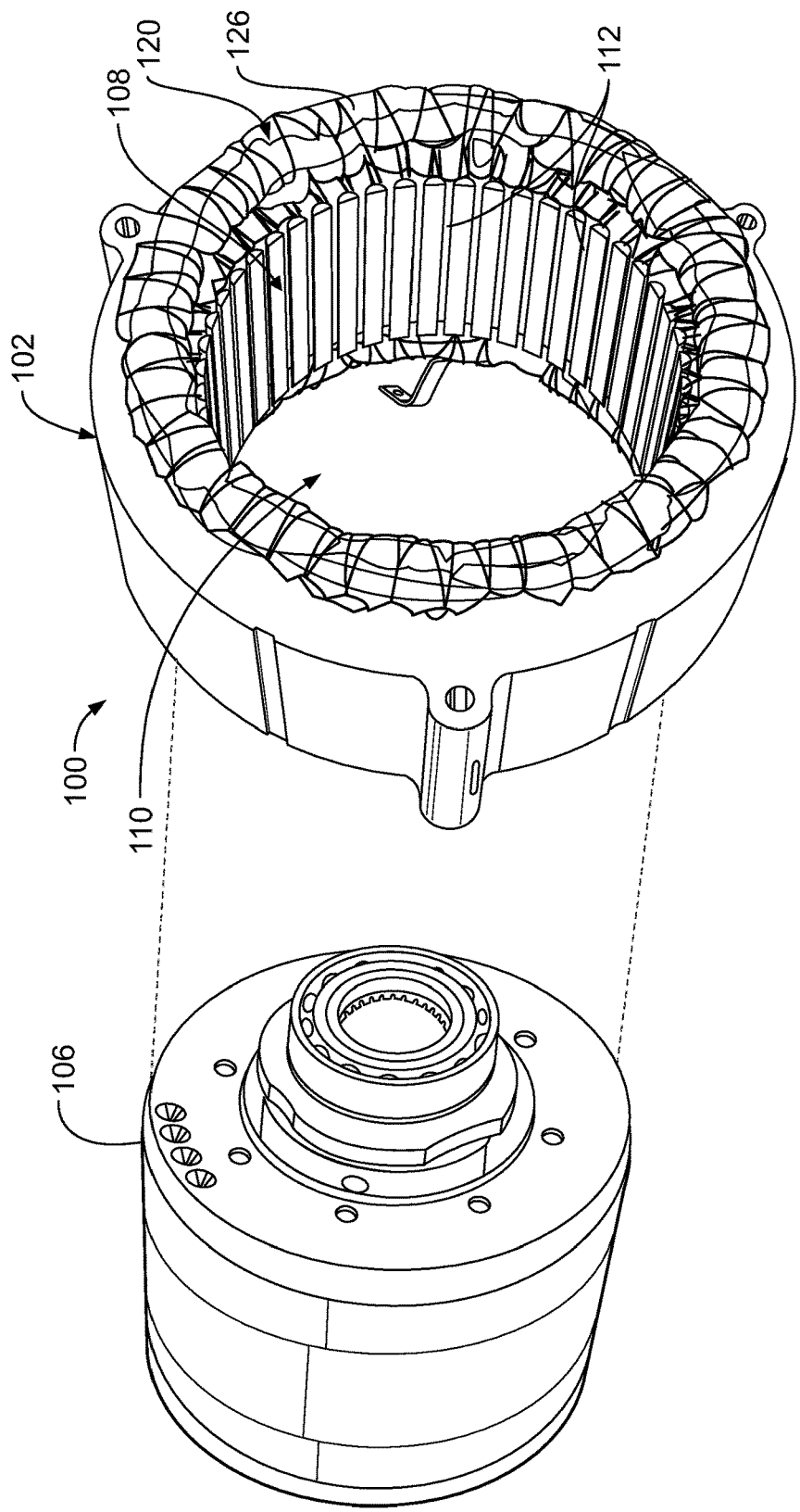
FIG. 2 is a perspective view of an example of an electric machine.

FIG. 2 shows an example of an electric machine 100 for an electrified vehicle. The electric machine 100 includes a stator core 102 and a rotor 106. Some electrified vehicles may include two such electric machines. One of the electric machines may function primarily as a motor and the other may function primarily as a generator. The motor may operate to convert electricity to mechanical power and the generator may operate to convert mechanical power to electricity. The stator core 102 may be made from a plurality of laminated steel segments, which are welded together. The stator core 102 may define an inner surface 108 and a cavity 110. The rotor 106 may be sized for disposal and operation within the cavity 110. A shaft (not shown) may be operably connected to the rotor 106 to drive rotation thereof.

A plurality of slots 112 are provided along the inner surface 108. The slots 112 may be formed, for example between a plurality of teeth extending inward from the inner surface 108. Windings 120 may be disposed within the slots 112. The windings 120, per circuit or phase, are a continuous wire that is disposed into one respective slot 112, turn through 180 degrees near the end of the respective slot 112, then run along another slot 112. Multiple windings may be provided in each slot 112. In an electric machine motor example, current may be fed to the windings 120 to obtain a rotation force on the rotor 106. In an electric machine generator example, current generated in the windings 120 by a rotation of the rotor 106 may be removed to power vehicle components. At each end of the stator 102, winding ends 126 are formed in the regions in which the wire of the wire windings 120 protrude from the slots 112 and turn 180 degrees from one respective slot 112 to another slot 112. During operation of the electric machine 100, heat may be generated along the windings 120 and end windings 126.

One known coolant configuration for end windings includes an apparatus for dripping a coolant onto the end windings through orifices in a transmission housing. Another configuration includes spraying a coolant from a rotor. However, both of these strategies may, in some instances, result in inconsistent coolant coverage over the end winding. Thus, hot spots, e.g. areas of the end winding with relative high temperatures, may arise due to the non-uniformity of coolant dispersal.

Other cooling schemes may include a fan arranged proximate the stator to cool the end windings. Yet another cooling scheme may include potting the end windings completely with a conductive epoxy, and subsequently removing heat via conduction through the epoxy. These schemes may result in inadequate heat being removed from the end windings. Still another cooling scheme may include providing a water jacket between the housing and the stator. However, a water jacket may not provide adequate cooling to the end windings.

Figure 3A:
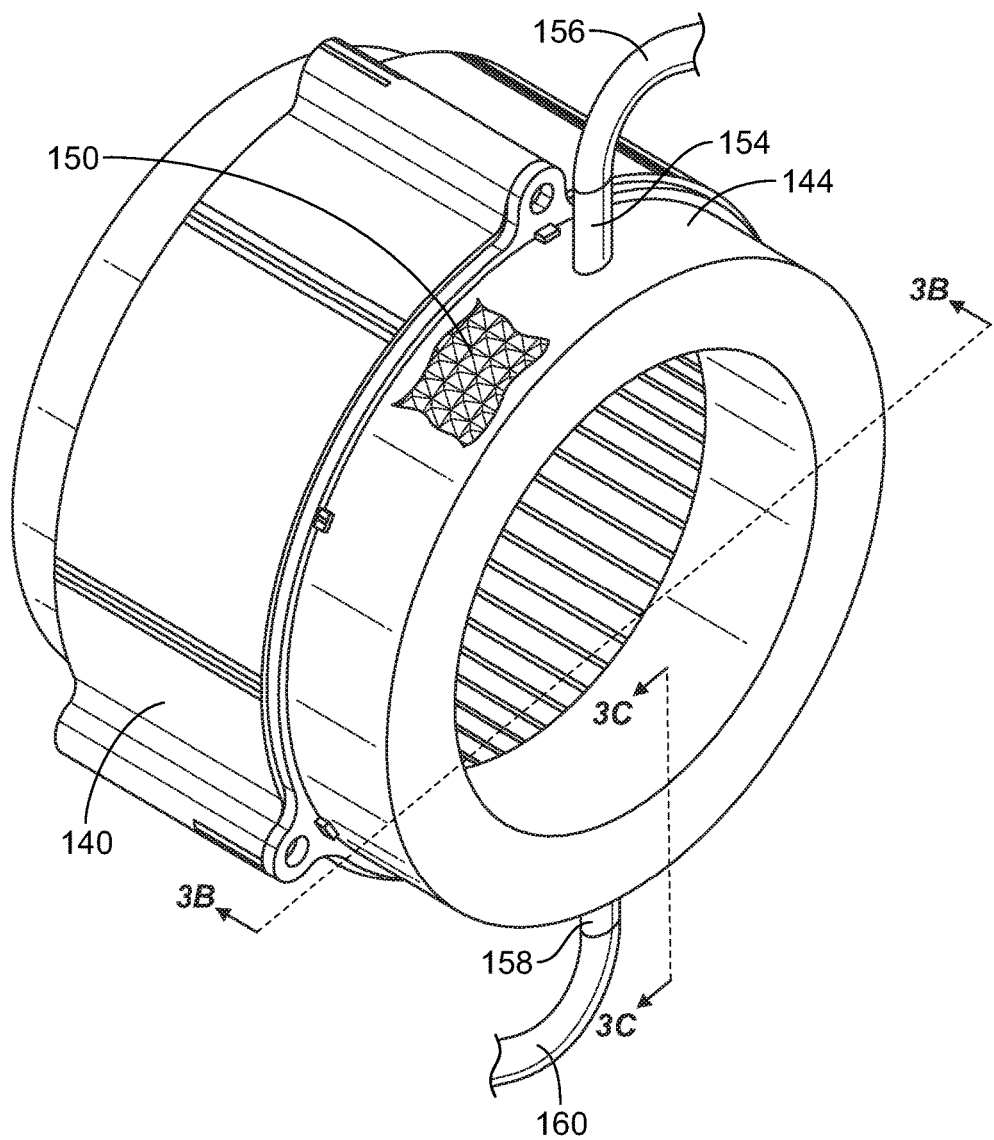
FIGS. 3A-3C are various views of an embodiment of a coolant device for an electric machine according to the present disclosure.
Figure 3B:
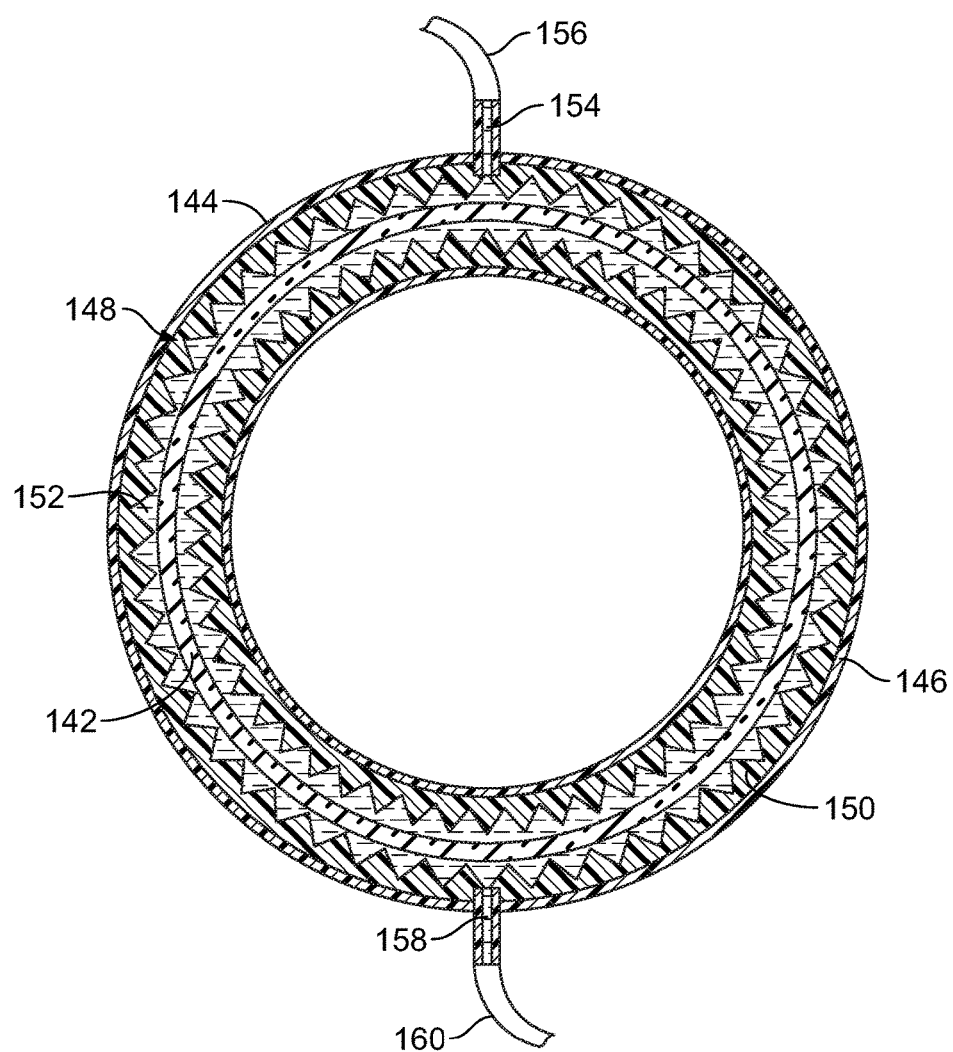
Figure 3C:
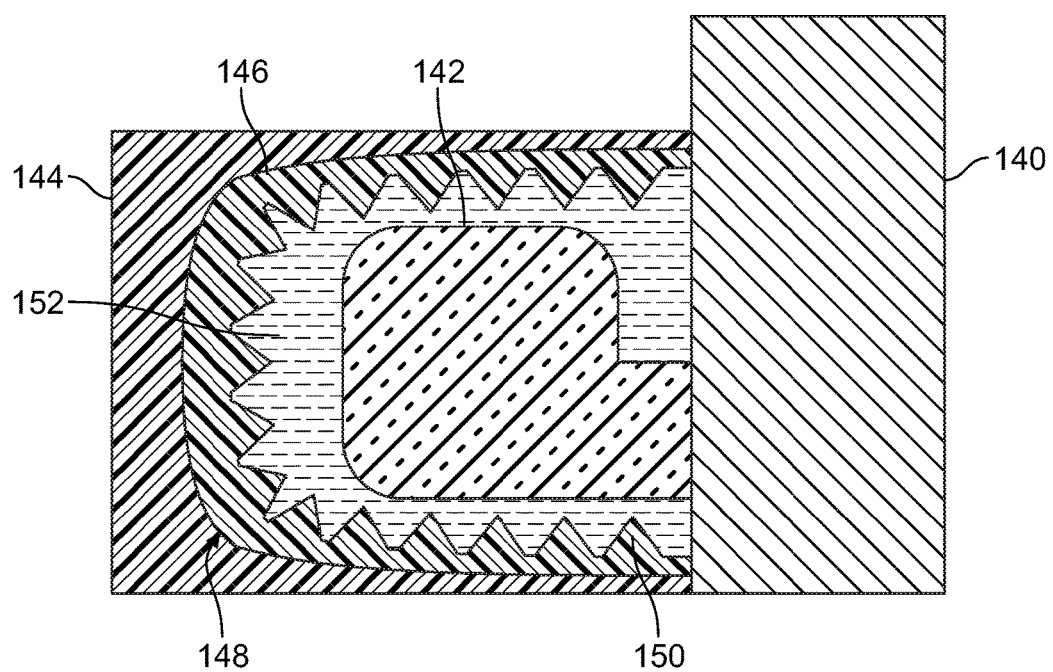

Referring now to FIGS. 3A through 3C, a cooling system according to the present disclosure is illustrated. FIG. 3A depicts a perspective view of a cooling system according to the present disclosure, and FIGS. 3B and 3C depict cross-sections A-A and B-B, respectively.

A stator 140 has a plurality of end windings 142 extending from an end of the stator 140. An encasement 144 is coupled to the end of the stator 140. The encasement 144 may be generally U-shaped, and thus cooperate with the stator 140 to define an interior cavity or pocket 146 therebetween. As illustrated in FIGS. 3A and 3B, the encasement 144 is generally annular.

An insert 148 is disposed within the pocket 146 and coupled to the encasement 144. The insert 148 includes a plurality of elongate flow disruption members 150 projecting into the pocket 146. In this embodiment, the flow disruption members 150 are generally triangular in profile, e.g. pyramid-shaped or wedge-shaped protrusions. In various embodiments, the flow disruption members 150 are provided in tangential rows and axial columns, e.g. in a regular grid or an offset grid pattern. The flow disruption members 150 may be provided along all interior surfaces of the insert 148, as illustrated in FIG. 3C. In alternative embodiments, flow disruption members may be provided along only a portion of the interior surfaces of the insert. As will be discussed in further detail below, the flow disruption members may have other profile shapes in alternative embodiments.

A coolant fluid 152 is provided within the pocket 146 and circulated through the encasement 144. The flow disruption members 150 generate turbulence in the flow of the coolant fluid 152, which in turn enhances heat transfer between the end windings 142 and the coolant fluid 152.

A first orifice or coolant passage 154 is fluidly coupled to a coolant supply duct 156 to supply the coolant 152. A second orifice or coolant passage 158 is fluidly coupled to a coolant return duct 160. The coolant 152 may thus circulate from a fluid source (not shown) through the coolant supply duct 156, through the encasement 144, and return to the fluid source by the return duct 160.

The coolant 152 preferably comprises a dielectric fluid, such as a hydrocarbon lubricant. In a preferred embodiment, the coolant 152 includes transmission oil. However, other coolant fluid compositions may be used.

In alternative embodiments, additional coolant passages and/or coolant passages in different locations may be provided relative to those shown in the embodiment of FIG. 3B.

The encasement 144 is preferably made of a plastic material, such as epoxy.

The insert 148 may be similarly made of a plastic material such as epoxy. In such an embodiment, the encasement 144 and insert 148 may be co-molded as an integral unit.

In alternative embodiment, the insert 148 may be made of a different material. In such an embodiment, the insert 148 may be joined to the encasement 144 by being inserted into the epoxy of the encasement 144 prior to curing the epoxy.

The assembled encasement 144 and insert 148 may be collectively referred to as a cover.

Referring now to FIGS. 4-7, various alternative embodiments of a coolant device are shown. For sake of convenience, only the respective insert portions of the various embodiments are shown. In practice, the respective inserts of these embodiments may be used in conjunction with a cover and stator, generally as illustrated in FIG. 3.

Figure 4:
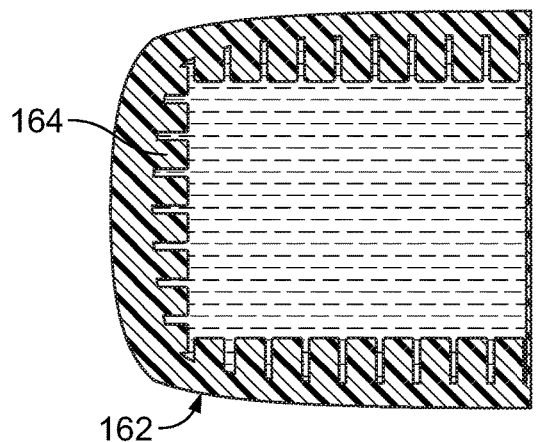
FIGS. 4-7 are cross-sectional views of various alternative embodiments of coolant devices for an electric machine according to the present disclosure.

Referring now to FIG. 4, an embodiment including an insert 162 is illustrated. The insert 162 includes a plurality of flow disruption members 164. In this embodiment, the flow disruption members 164 are generally rectangular in profile, e.g. being generally an extruded rectangle in shape.

Figure 5:
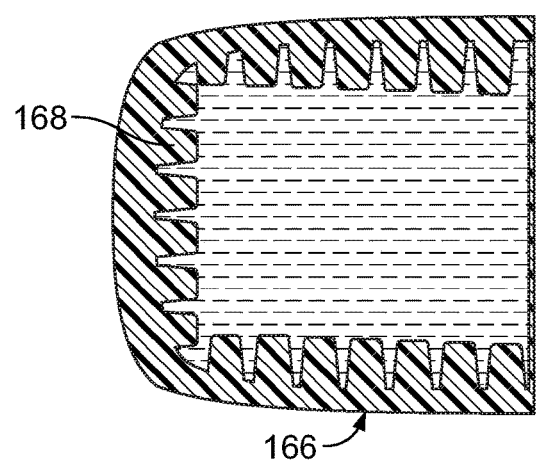

Referring now to FIG. 5, an embodiment including an insert 166 is illustrated. The insert 166 includes a plurality of flow disruption members 168. In this embodiment, the flow disruption members 168 have a tapered profile, e.g. being generally an extruded trapezoid in shape.

Figure 6:
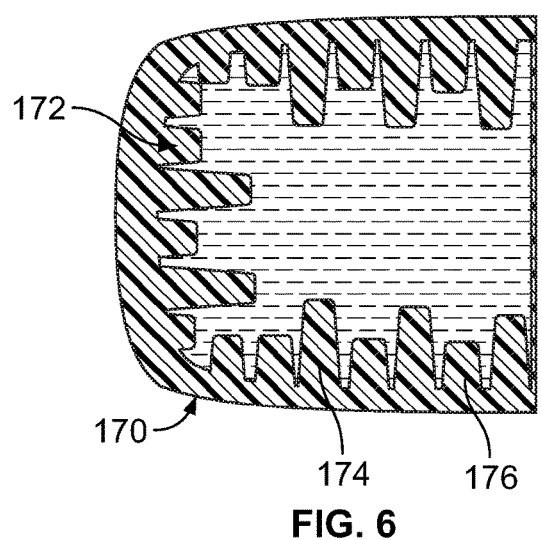

Referring now to FIG. 6, an embodiment including an insert 170 is illustrated. The insert 170 includes a plurality of flow disruption members 172. In this embodiment, the plurality of flow disruption members 172 include flow disruption members of differing heights, e.g. terminating at differing vertical and horizontal positions toward the interior of the insert 170. For example, the plurality of flow disruption members 172 may include a first number of flow disruption members 174 terminating at a first vertical position and a second number of flow disruption members 176 terminating at a second vertical position, with the first vertical position being different from the second vertical position.

Figure 7:
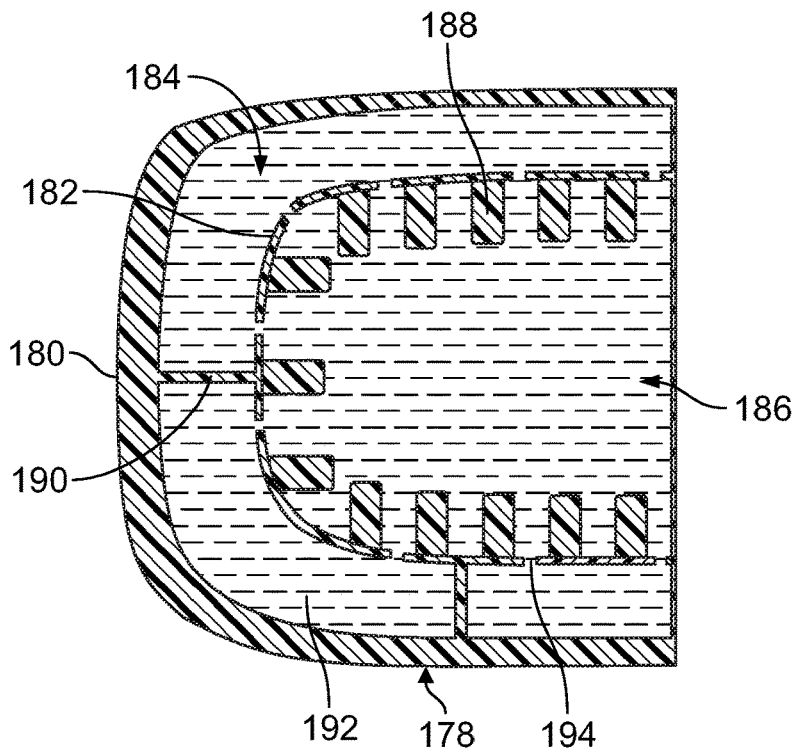

Referring now to FIG. 7, an embodiment including an insert 178 is illustrated. In this embodiment, the insert 178 includes an outer shell 180 and an intermediate shell 182. The intermediate shell 182 divides the interior of the insert into an outer zone 184 and an inner zone 186. A plurality of flow disruption members 188 extend from an inner surface of the intermediate shell 182 to protrude into the inner zone 186. The intermediate shell 182 is supported from the outer shell 180 by braces 190. Coolant 192 may circulate between the outer zone 184 and the inner zone 186 via passages 194 extending through the intermediate shell 182 and fluidly coupling the outer zone 184 and the inner zone 186. Thus, the outer zone 184 may function as a plenum to distribute the coolant 192 about the insert 178, while the flow disruption members 188 of the inner zone 186 induce turbulent flow for more effective thermal transfer. Such an embodiment thus promotes uniform flow, and in turn promotes uniform cooling.

Figure 8:
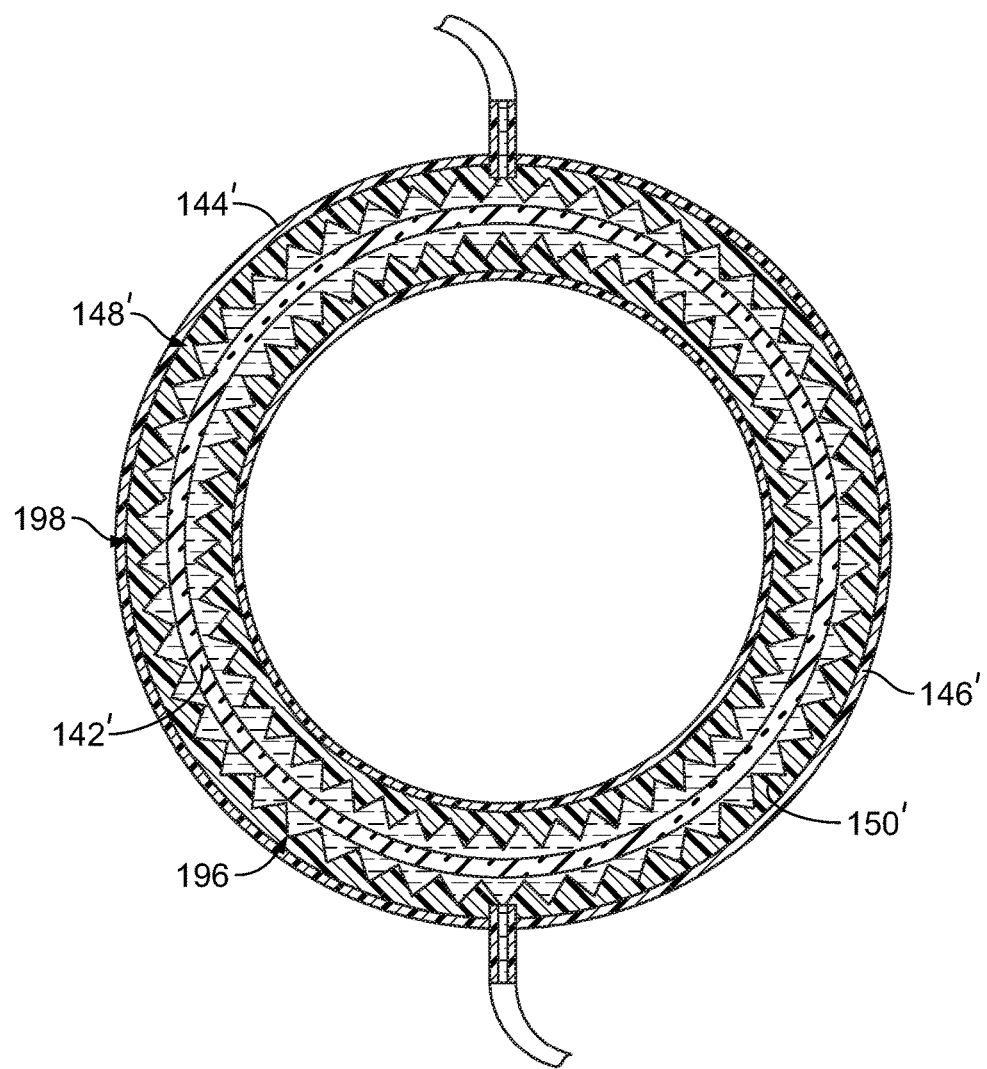
FIG. 8 is a cross-sectional view of an alternative embodiment of a coolant device for an electric machine according to the present disclosure.

Referring now to FIG. 8, an alternative embodiment of a coolant device for an electric machine according to the present disclosure is shown in cross-section. In this embodiment, an annular encasement 144' is provided. The encasement 144' defines an internal pocket 146'. An insert 148' is disposed within the pocket 146' and coupled to the encasement 144'. The insert 148' includes a first angular portion 196 and a second angular portion 198. A plurality of elongate flow disruption members 150' project into the pocket 146 from the first angular portion 196, while no flow disruption members project from the second angular portion 198. The second angular portion 198 thus includes a hollow cavity. Such an embodiment may be less expensive and less difficult to manufacture, and may still satisfy thermal requirements of some embodiments.

Figure 9:
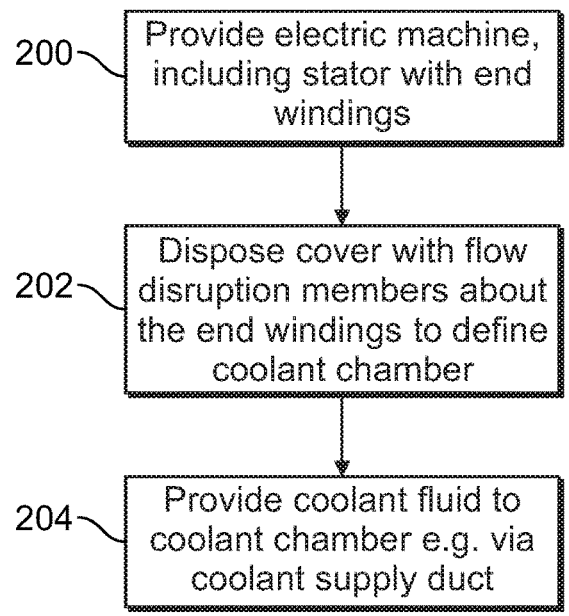
FIG. 9 is a flowchart illustrating a method of cooling an electric machine according to the present disclosure.

Referring now to FIG. 9, a method of cooling an electric machine according to the present disclosure is illustrated in flowchart form.

An electric machine is provided, as illustrated at block 200. The electric machine includes a stator having slots with wire windings disposed in the slots and forming end windings.

A cover is disposed about the end windings to define a coolant chamber between an inner surface of the cover and the stator, as illustrated at block 202. The cover includes a plurality of flow disruption members extending from the inner surface into the coolant chamber.

A coolant fluid is provided to the coolant chamber, as illustrated at block 204. This may include providing coolant fluid via a coolant supply duct coupled to a coolant passage extending through the cover and being in fluid communication with the coolant chamber.

As may be seen, the present disclosure provides a coolant device for end windings of an electric machine that provides consistent cooling for all end windings, avoiding hot spots which may degrade the electric machine. This may improve reliability and, in turn, increase customer satisfaction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric machine comprising:
   a stator defining a plurality of slots;
   a plurality of wire windings disposed in the slots and forming end windings extending out of the slots; and
   a cover fully encapsulating the end windings, defining a coolant chamber between an inner surface of the cover and the stator, and including a plurality of flow disruption members integrally formed with the cover to extend from the inner surface into the coolant chamber.

2. The electric machine of claim 1, further comprising:
   a plurality of coolant passages extending through the cover and being in fluid communication with the coolant chamber; and
   a coolant supply duct coupled to at least one of the coolant passages and configured to provide a coolant fluid to the coolant chamber.

3. The electric machine of claim 2, wherein the coolant fluid includes a hydrocarbon lubricant.

4. The electric machine of claim 1, wherein the cover is generally shaped as an annular ring having a first circumferential portion and a second circumferential portion, the first circumferential portion having the plurality of flow disruption members extending from the inner surface, the second circumferential portion having no flow disruption members extending from the inner surface.

5. The electric machine of claim 1, wherein the cover includes an outer shell and an intermediate shell, the inner surface being an inner surface of the intermediate shell, the intermediate shell further having an intermediate shell outer surface, the outer shell having an outer shell inner surface, a second coolant chamber being defined between the outer shell inner surface and the intermediate shell outer surface, the second coolant chamber being in fluid communication with the coolant chamber.

6. The electric machine of claim 1, wherein the cover comprises an epoxy material.

7. A method of cooling an electric machine, comprising:
   providing an electric machine, including a stator with slots defined therein and wire windings disposed in the slots and forming end windings; and
   disposing a cover about the end windings to fully encapsulate the end windings and to define a coolant chamber between an inner surface of the cover and the stator, the cover including a plurality of flow disruption members extending from the inner surface into the coolant chamber.

8. The method of claim 7, further comprising providing a coolant fluid to the coolant chamber.

9. The method of claim 8, wherein the cover includes a plurality of coolant passages extending through the cover and being in fluid communication with the coolant chamber and a coolant supply duct coupled to at least one of the coolant passages, and wherein providing a coolant fluid comprises providing a coolant fluid via the coolant supply duct.

10. An electric motor, comprising:
    a stator having a first end, a second end, and a central portion extending from the first end to the second end, the central portion having projections extending therefrom, defining slots between the projections;
    a plurality of wire windings disposed in the slots;
    end windings proximate both the first end and the second end of the stator; and
    a first end cover fully encapsulating the end windings proximate the first end; and
    a second end cover fully encapsulating the end windings proximate the second end,
    wherein each of the first end cover and the second end cover has an inner surface, a coolant cavity defined between the inner surface and the stator, and a plurality of turbulence generation members extending from the inner surface into the coolant cavity.

11. The electric motor of claim 10, further comprising:
    a plurality of coolant passages extending each of the first end cover and the second end cover for fluid communication with a respective coolant cavity; and
    a coolant supply duct coupled to at least one of the coolant passages and configured to provide a coolant fluid to the respective coolant cavity.

12. The electric motor of claim 11, wherein the coolant fluid includes a hydrocarbon lubricant.

13. The electric motor of claim 10, wherein each of the first end cover and the second end cover is generally shaped as an annular ring having a first circumferential portion and a second circumferential portion, the first circumferential portion having the plurality of turbulence generation members extending from the inner surface, the second circumferential portion having no turbulence generation members extending from the inner surface.

14. The electric motor of claim 10, wherein the each of the first end cover and the second end cover includes an outer shell and an intermediate shell, the inner surface being an inner surface of the intermediate shell, the intermediate shell further having an intermediate shell outer surface, the outer shell having an outer shell inner surface, a second coolant cavity being defined between the outer shell inner surface and the intermediate shell outer surface, the second coolant cavity being in fluid communication with the coolant cavity.

15. The electric motor of claim 10, wherein each of the first end cover and the second end cover comprises an epoxy material.

16. The electric motor of claim 10, wherein the plurality of turbulence generation members form an integral unit with a respective first end cover or second end cover.

* * * * *